W. P. Craig,
Levee.
No. 95,090. Patented Sep. 21, 1869.

ATTEST.
Jas. H. Layman.
Sam Knight.

INVENTOR.
W. P. Craig,
By Knight Bros.
Attys.

N. PETERS, PHOTO-LITHOGRAPHER, WASHINGTON, D.C.

United States Patent Office.

WALDO P. CRAIG, OF MILTON, KENTUCKY, ASSIGNOR TO HIMSELF AND WILLIAM M. DOUGHTY.

Letters Patent No. 95,090, dated September 21, 1869.

IMPROVED LEVEE

The Schedule referred to in these Letters Patent and making part of the same.

*To whom it may concern:*

Be it known that I, WALDO P. CRAIG, of Milton, Trimble county, Kentucky, have invented a new and useful Mode of Constructing Dams, Breakwaters, Levees, &c.; and I hereby declare the following to be a full, clear, and exact description thereof, reference being had to the accompanying drawings, making part of this specification.

My invention relates to a mode of constructing dams, breakwaters, levees, and the like, by which I am enabled to cross any body of water wherein piles can be driven, the structure when complete being proof against the inroads of water-rats and other burrowing animals, and against the undermining action of the water.

Figure 1 is a side elevation, and

Figure 2, a top view, partially in section, of a range of guide and sheet-piling, on my plan.

Figure 1:
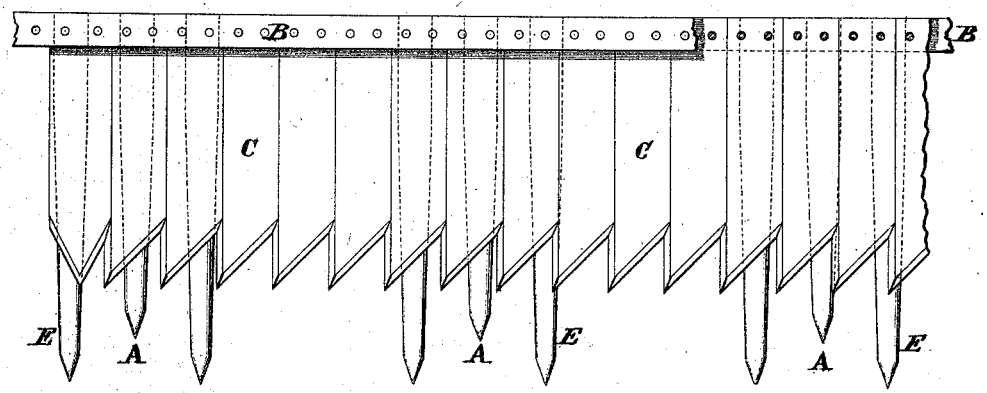
Figure 2:
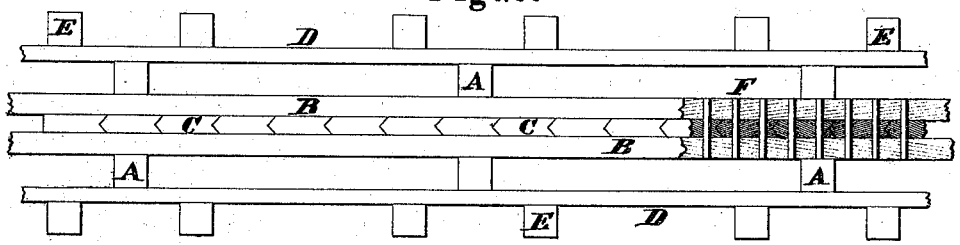
Figure 3:
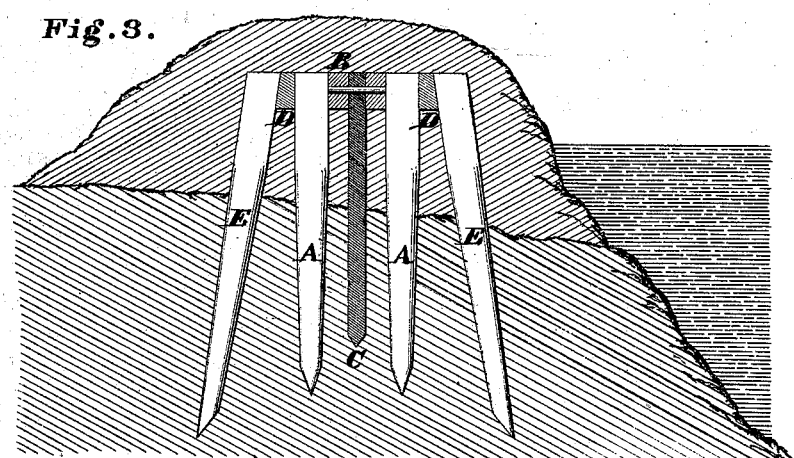
Figure 3 is a transverse section thereof, embedded in a levee or river-wall.
Figure 4:
Figure 4 shows one of my sheet-piles detached.
Figure 5:
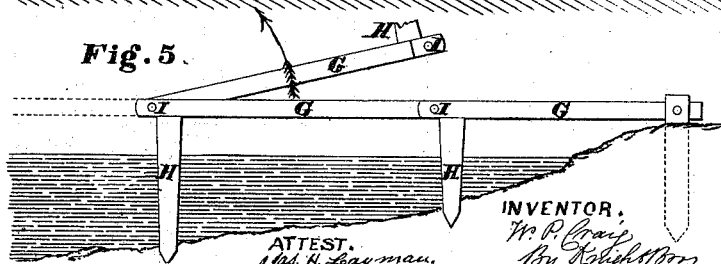
Figure 5 shows a series of guide-piles, connected with swinging sections.
Figure 6:
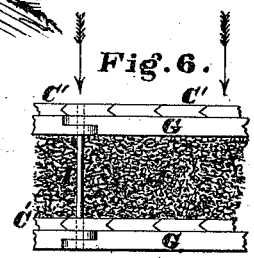
Figure 6 is a top view thereof.

My mode of construction for a simple levee-wall is shown in figs. 1, 2, and 3.

The inner tiers of guide-piles A, being first driven, have longitudinal timbers or walings B, spiked to them, which walings afford guides for driving a tier of sheet-piling, C, whose edges are alternately V-tongued and grooved, and which are bevelled at their lower ends, as shown, so as to enable them to be guided to their places in the act of driving, and thus to form a continuous wall of partition, impervious both to water and animals.

For additional security in deep water, or in streams subject to freshets, one or more additional lines of walings, D, and of piles E, may be employed, and the whole be secured by spikes or bolts F.

When designed to cross a crevasse, or to project into a river or harbor, I provide balks or walings G, to whose lower sides are secured piles H, and which are hinged to the main walings by bolts or pintles I. A section of this construction being brought down to the position represented at X, affords a guide for driving two lines of sheet-pilings, C', on the up-stream side of the balks, and which, being filled in with rubble or concrete J, affords a permanent pier or causeway.

This section, then, may form the abutment for the next, which being finished in like manner, may be followed by another section, and so on indefinitely.

I claim herein as new, and of my invention—

1. The combined arrangement of guide-piles A A, walings B B, and sheet-piling C, substantially as herein described, the sheet-piling being flanked on either side by the guide-piles and walings, and all constructed and applied substantially in the manner and for the purposes set forth.

2. The piles H, attached to the lower side of hinged or jointed sections G, so as to be driven in the act of lowering said sections, as and for the purpose specified.

3. The combination, with the subject of the last preceding clause, of the sheet-piling C', and concrete or rubble-filling J, as and for the purpose set forth.

In testimony of which invention, I hereunto set my hand.

W. P. CRAIG.

Witnesses:
GEO. H. KNIGHT,
JAMES H. LAYMAN.